| United States Patent [19] | [11] Patent Number: 4,822,700 |
| Doddapaneni et al. | [45] Date of Patent: Apr. 18, 1989 |

[54] SAFETY CATHODE FOR NON-AQUEOUS ELECTROCHEMICAL CELL

[75] Inventors: Narayan Doddapaneni, Glenside; David L. Chua, Wayne, both of Pa.; Gerald F. Hoff, Columbia; James D. Jensen, Highland, both of Md.

[73] Assignee: Honeywell Inc., Minneapolis, Minn.

[21] Appl. No.: 185,586

[22] Filed: Apr. 22, 1988

[51] Int. Cl.[4] .................... H01M 10/36; H01M 10/44
[52] U.S. Cl. ......................................... 429/50; 429/101; 429/194; 429/218
[58] Field of Search ............... 429/50, 101, 194, 57, 429/218

[56] References Cited

U.S. PATENT DOCUMENTS

| 3,468,708 | 9/1969 | Davis et al. | 429/52 |
| 3,551,205 | 12/1970 | Fraioli et al. | 429/217 |
| 3,703,413 | 11/1972 | Arrance | 429/217 |
| 3,773,878 | 11/1973 | Jahnke | 264/49 |
| 4,051,305 | 9/1977 | Benczur-Urmossy et al. | 429/217 |
| 4,071,665 | 1/1978 | Garth | 429/197 |
| 4,407,910 | 10/1983 | Catanzarite | 429/57 |
| 4,598,029 | 7/1986 | Doddapaneni et al. | 429/50 |

*Primary Examiner*—Anthony Skapars
*Attorney, Agent, or Firm*—C. G. Mersereau

[57] ABSTRACT

Exothermic reactions at elevated temperatures in high rate non-aqueous active metal electrochemical cells which include an alkali metal anode, an electrolyte system including an electrolyte salt dissolved in a non-aqueous solvent depolarizer, by the provision of a reaction limiting positive electrode material which includes an amount of carbon black, an amount of binder and an amount of ceramic material, said ceramic material being substantially unreactive with other cell species below a predetermined temperature but capable of reacting to form substantially inactive products with the metal of the anode material at or above the predetermined temperature.

14 Claims, 2 Drawing Sheets

SAFETY CATHODE FOR NON-AQUEOUS ELECTROCHEMICAL CELL

The U.S. Government has certain rights in this invention pursuant to a contract with the Department of the Navy.

BACKGROUND OF THE INVENTION

1. Field of the Invention

The present invention relates to the field of non-aqueous, active metal electrochemical cells and, more particularly, to an improved cathode for high energy density cells which allows the cells to safely withstand extensive thermal incursions associated with incendiary or short circuit conditions.

2. Background Art

Much work has been done in the field of high energy battery systems utilizing highly reactive anode materials such as alkali metals in combination with non-aqueous electrolytes. In these cells, the preferred alkali metal anode is lithium. The electrolyte normally includes a solute which is commonly a metal salt or complex metal salt of the anode metal dissolved in a compatible non-aqueous solvent depolarizer. Examples of such salts include lithium tetrachloroaluminate and the solvent depolarizers typically include those containing sulfur dioxide ($SO_2$) and oxyhalides including, thionyl chloride ($SOCl_2$) or sulfuryl chloride ($SO_2Cl_2$). A relatively inert cathode collector such as a nickel or stainless steel grid covered with a porous layer of compressed carbon black such as an acetylene black, completes the cell couple.

Safety is one of the major concerns associated with high energy density systems including lithium-thionyl chloride ($Li/SOCl_2$) couples. The possibility of such a cell or battery rupturing or exploding under a variety of abuse conditions has long been a drawback to certain applications. The problem appears to be centered around thermal incursions that may occur under short circuit or incendiary conditions. Generally, when the temperature in a cell is sufficiently elevated to occasion the melting of the anode, the molten anode material then reacts with other chemical species in the cell, often rather violently. Increased internal pressure during excessive heat generation is another safety hazard.

Ceramic materials in contact with the anode have been used as neutralizing agents to react with it to reduce the hazardous effect of the liquified anode material at the anode melting temperature before more violent reactions take place with other cell species. This approach is described by Catanzarite in U.S. Pat. No. 4,407,910. A ceramic separator has been proposed in U.S. Pat. No. 4,598,029 by N. Doddapaneni and D.L. Chua, co-inventors in the present application. That reference deals with an approach to minimizing hazards in which a porous ceramic separator is used to prevent excessive voltage drop during cell reversal under forced overdischarge.

Despite these prior attempts to solve the safety problems of these cells associated with the propagation of thermal run away reactions, none have solved the problem with respect to the occurrence of direct internal shorts. Shorts may be due to defective construction or caused by violent and external trauma such as nail piercing or bullet penetration associated with military applications of the cells.

SUMMARY OF THE INVENTION

By means of the present invention it has been found that the introduction of ceramic materials directly into the carbon cathode structure thereby "doping" the cathode increases safety by reducing exothermic reactions during thermal incursions. Amounts of up to about 30% of inert material can be introduced in the carbon electrode, without a significant increase in resistance or reduction of cell capacity including cell voltage.

In one embodiment, the ceramic-doped carbon positive electrode is fabricated by blending, in the desired weight percentages, of polytetrafluoroethylene (PTFE) such as Teflon - 60 (du Pont), carbon substrates such as 100% compressed grade Shawinigan Acetylene Black (SAB), and ceramic material, then processing this blend in mineral spirits to the desired thickness in a well known manner. While anay ceramic material having the necessary chemical characteristics can be used, one particular ceramic used was in fiber form made from Type 300-20 ceramic paper, obtained from Cotronics Corporation, Brooklyn. NY, USA. Its chemical composition by weight is $Al_2O_3$ (67%). $SiO_2$ (28%). starch (4%). neoprene rubber (0.5%). and acrylic polymer (0.5%). Prior to blending, the paper was baked to remove most of the starch and the organic materials and then pulverized for 10 minutes in a grinder. The density and mechanical handling characteristics of the modified electrodes are similar to the undoped electrodes.

DETAILED DESCRIPTION

Figure 1:
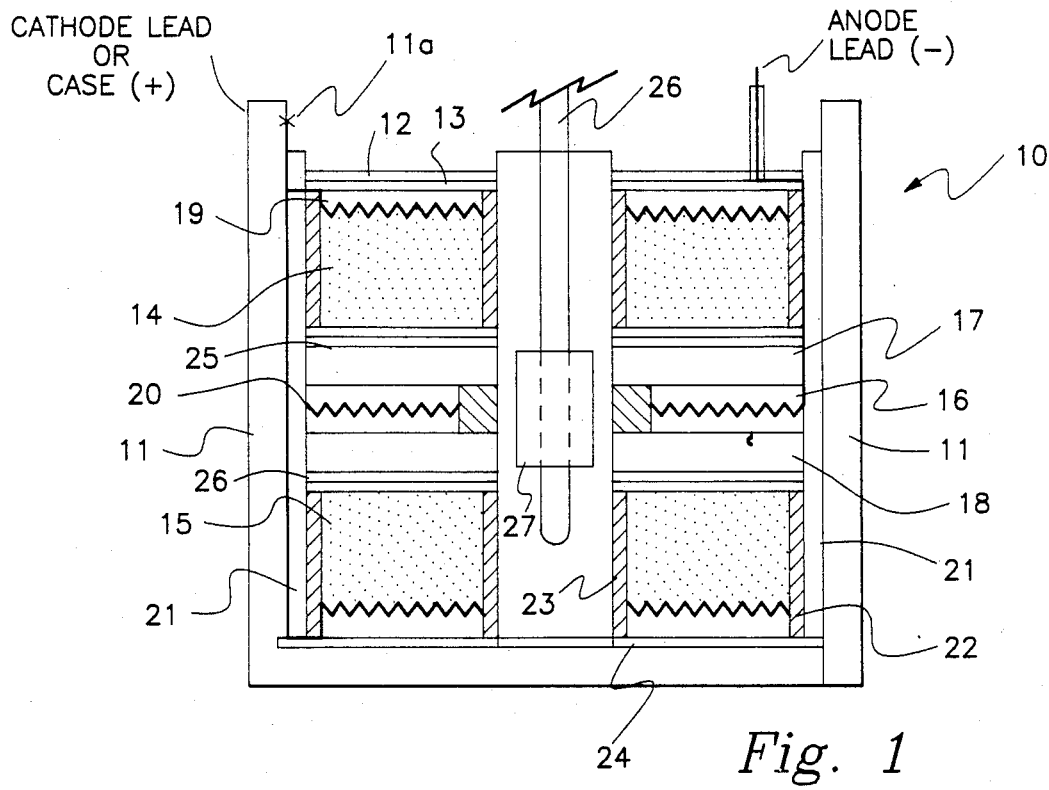
FIG. 1, is a schematic elevational view, in section, of a typical cathode-anode-cathode cell configuration employing cathodes of the invention.

FIG. 1 depicts a elevational view, in section, of a cell which typifies the type in which the cathode of the invention might be used. It is the type of cell which was used to gather the data for FIGS. 2-4. Specifications of typical actual cell models are listed in Table 1, below.

The cell of FIG. 1, shown generally at 10, includes an outer case 11 which typically serves as the positive terminal itself or via an external cathode connection as at 11a. The lead as at 11a becomes more important when the outer case 11 is made nonconducting. The cell depicted is of a torroidal or donut shape so that each of the layered components appears both in the left and right halves of the sectional view.

Top insulation layers of high impact plastic, or the like, are provided at 12 and 13 which insulate and seal the top of the cell internally. A metal/ceramic cap (not shown) may be used which fits within the case above the top insulation layers to accomplish the final seal for the cell. The cell contains two cathodes 14 and 15 with an active metal anode sandwiched there between at 16 and separated physically from the cathodes as by anode spacer layers 17 and 18. Each cathode includes a grid 19 which may be nickel stainless steel or the like. Each anode typically comprises a lithium grid as at 20.

The interior of the outer cell case 11 is further provided with a layer of wall insulation as at 21 and the cathodes are further normally insulated at both the inner and outer walls at 22 and 23 and the bottom is insulated at 24. The cell separators are shown at 25 and 26.

The construction featuring a single anode layer between the two (2) cathode layers is known as a three plate C-A-C cell design. Temperature data was obtained for the cells using an internally mounted type "K" thermocouple probe illustrated at 26 which also was provided with a lithium reference electrode 27.

A preferred ceramic doped carbon positive electrode was fabricated by blending, in the desired weight percentages, polytetrafluoroethylene (PTFE) in the form of Teflon - 60 (du Pont), 100% compressed grade Shawinigan Black Carbon (SAB) and ceramic fibers, and then processing this blend in mineral spirits to the desired thickness using well known rolling techniques.

The ceramic fibers were made from Type 300-20 ceramic paper (Cotronics). Its chemical composition by weight is $Al_2O_3$ (67%), $SiO_2$ (28%), starch (4%), neoprene rubber (0.5%), and acrylic polymer (0.5%). Prior to blending, the paper was baked at 400° C. for three hours to remove most of the starch and the organic materials and then pulverized for 10 minutes in a grinder.

The resulting ceramic - carbon-PTFE electrode pad had a density of 0.3±0.01 gm/cc which was observed to reamin constant regardless of the amount of ceramic added up to about 40%. The density and mechanical handling characteristics of the modified electrode were similar to the undoped electrode. With amounts of ceramic greater than 40% the cathodes lacked necessary mechanical integrity, however.

Test Cells

A 1.4 M $LiAlCl_4.SO_2/SOCl_2$ electrolyte with less than 100 ppm water content and glass mat or ceramic separators were used in all test cells. Of course, other electrolyte systems and separators may also be used in accordance with the invention.

1. Laboratory Cells

Discharge characteristics of ceramic doped and undoped cathodes were evaluated in $Li/SOCl_2$ cells. These cells have two-plate prismatic electrodes (1.27 x 2.54 cm) separated by two layers of 0.0127 cm thick Manninglass separators obtained from Manning Paper Co. of Troy, New York. The anode and cathode were both 0.051 cm thick. An expanded metal nickel grid (EXMET Corporation Bridgeport, Conn.) (0.0075 Ni 0.025 3/0) was employed as the current collector for both electrodes. All cells were activated with 2 ml of electrolyte and were then discharged at constant currents of 1 and 10 $mA/cm^2$ at 22±1° C.

2. Engineering Cells

Test cells of 10.16 and 15.24 cm diameter (FIG. 1 and Table 1) used to validate laboratory cell performance and to conduct abuse tests, were as shown schematically in FIG. 1. Small test cells (10.16 cm) were used to study low rate discharge and short circuit behavior whereas larger cells (15.24 cm) were employed to monitor the current and voltage behavior of $Li/SOCl_2$ cells under a very low resistive discharge.

TABLE 1

Physical Electrode Dimensions For The "Donut Shaped" 10.16 cm and 15.24 cm Diameter Cells

| Cell | 10.16 $cm^a$ | 15.24 $cm^b$ |
|---|---|---|
| Capacity | 100 Ah | 95 Ah |
| Anode | | |
| Thickness | 0.87 cm | 0.406 cm |
| OD | 9.57 cm | 13.33 cm |
| ID | 4.27 cm | 4.44 cm |
| Surface Area | 114 $cm^2$ | 226 $cm^2$ |
| Wt. | 26.8 gms (103.4 Ah) | 24.56 gms (94.8 Ah) |
| Cathode | | |
| Thickness (each) | 0.864 cm | 0.864 cm |
| OD | 10.16 cm | 13.72 cm |
| ID | 3.69 | 3.81 cm |
| Surface Area | 120 $cm^2$ | 246 $cm^2$ |
| Wt. | 39.8 gms (84 Ah)$^c$ | 89.4 gm (188 Ah)$^c$ |
| Separator | Manninglass | Ceramic |
| | (2 x .0127 cm) | (2 x .071 cm) |
| Electrolyte | 110.5 cc | 110 cc |
| Reserve | 130 cc | 245 |
| Total | 240.5 cc | 355 cc |

$^a$Cathode Limited Cell
$^b$Anode Limited Cell
$^c$Based on 2.1 Ah/g
(0.0075 SS 0.025 3/0 Exmet grids were used as current collection in both electrodes.)

TESTING

1. Laboratory Cells

The results of laboratory cell discharge tests are given in Table 2. These data suggest that ceramic fiber concentrations in the 5 to 40 weight percent range do not degrade performance at either discharge rate when compared with baseline cells (with undoped cathodes.) The ranges of the specific cathode capacities are 2.0 to 2.2 Ah/gm at 1 $mA/cm^2$ and 0.8 to 1.0 Ah/gm at 10 $mA/cm^2$ discharge. The magnitude of the variations in the observed capacity and voltage values are believed to be well within experimental error for this size cell.

It is noteworthy that the doping of cathodes with ceramic did not effect the cell performance even in acidic electrolytes. However, in contrast with the ceramic doping, doping with other inert materials such as PTFE and Silica do deteriorate the $Li/SOCl_2$ cell performance in all but very small concentrations.

TABLE 2

Discharge Performance at 22° C. of Cathode-Limited Laboratory Cells Current Density

| Ceramic Fiber Concentration (Weight %) | Sample Size No. | 1 $mA/cm^2$ | | | 10 $mA/cm^2$ | | |
|---|---|---|---|---|---|---|---|
| | | Time to 2.5 V (h) | Voltage at ½ (V) | Specific Cathode Capacity[1] (Ah/gm) | Time to 2.5 V (min) | Voltage at ½ (V) | Specific Capacity (Ah/gm) |
| 0 Baseline | 2 | 42.8 | 3.35 | 2.05 | 117 | 3.09 | 0.99 |
| | | 40.7 | 3.33 | 1.99 | 100 | 3.08 | 0.85 |
| 5 | 2 | 40.0 | 3.32 | 1.95 | 106 | 3.07 | 0.86 |
| | | 42.5 | 3.32 | 2.04 | 96 | 3.07 | 0.78 |

TABLE 2-continued

Discharge Performance at 22° C. of Cathode-Limited Laboratory Cells Current Density

| Ceramic Fiber Concentration (Weight %) | Sample Size No. | 1 mA/cm² | | | 10 mA/cm² | | |
|---|---|---|---|---|---|---|---|
| | | Time to 2.5 V (h) | Voltage at ½ (V) | Specific Cathode Capacity[1] (Ah/gm) | Time to 2.5 V (min) | Voltage at ½ (V) | Specific Capacity (Ah/gm) |
| 10 | 2 | 42.5 | 3.37 | 2.04 | 110 | 3.09 | 0.89 |
|  |  | 43.4 | 3.35 | 2.06 | 100 | 3.08 | 0.81 |
| 20 | 2 | 41.5 | 3.36 | 2.12 | 95 | 3.10 | 0.80 |
|  |  | 40.5 | 3.37 | 2.04 | 90 | 3.10 | 0.78 |
| 30 | 2 | 39.5 | 3.35 | 1.99 | 93 | 3.08 | 0.78 |
|  |  | 39.0 | 3.36 | 1.97 | 110 | 3.09 | 0.91 |

NOTE:
[1]Capacity (Ah/g) was based on the weight of substrate mix of the finished cathode.

2. Engineering Cells

The 10.16 cm diameter size cells of FIG. 1 and Table 1 were used for low rate discharge testing. These cells were all discharged to 2.00 volts under a resistive load of 45 ohms at ambient temperature.

Figure 2:
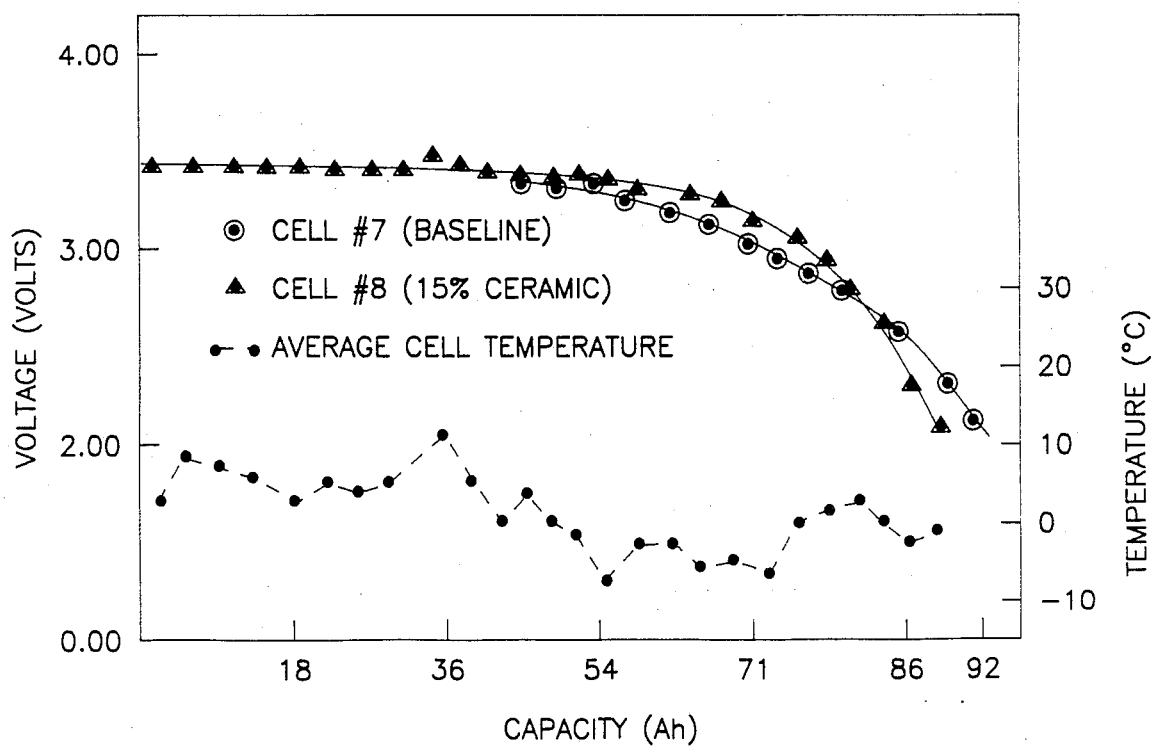
FIG. 2 depicts plots of discharge characteristics for $Li/SOCl_2$ cells such as those of FIG. 1, under a resistive load of 45 ohms for both a baseline cathode and a cathode doped with 15% of ceramic fibers.

FIG. 2 shows a plot of cell voltage versus capacity and ambient temperature for cell #7 (baseline cathode) and cell #8 (modified cathode with 15% ceramic). The temperature varied from −6 to 10° C. over the length of discharge. The cell voltge for cell #7 at 50% depth of discharge was 3.382 volts and average current density was 0.606 ma/cm². For cell #8, the cell voltage at 50% depth of discharge was 3.398 volts and an average current density was 0.634 mA/cm² over the length of discharge. The specific cathode capacity for cells #7 and #8 were 2.22 and 2.27 Ah/gm respectively.

These results indicate essentially no difference between these two cathode structures. Cell failure was monitored by a lithium reference electrode (FIG. 1) and both cells failed due to excessive cathode polarization.

3. Cell Abuse Tests

Figure 3:
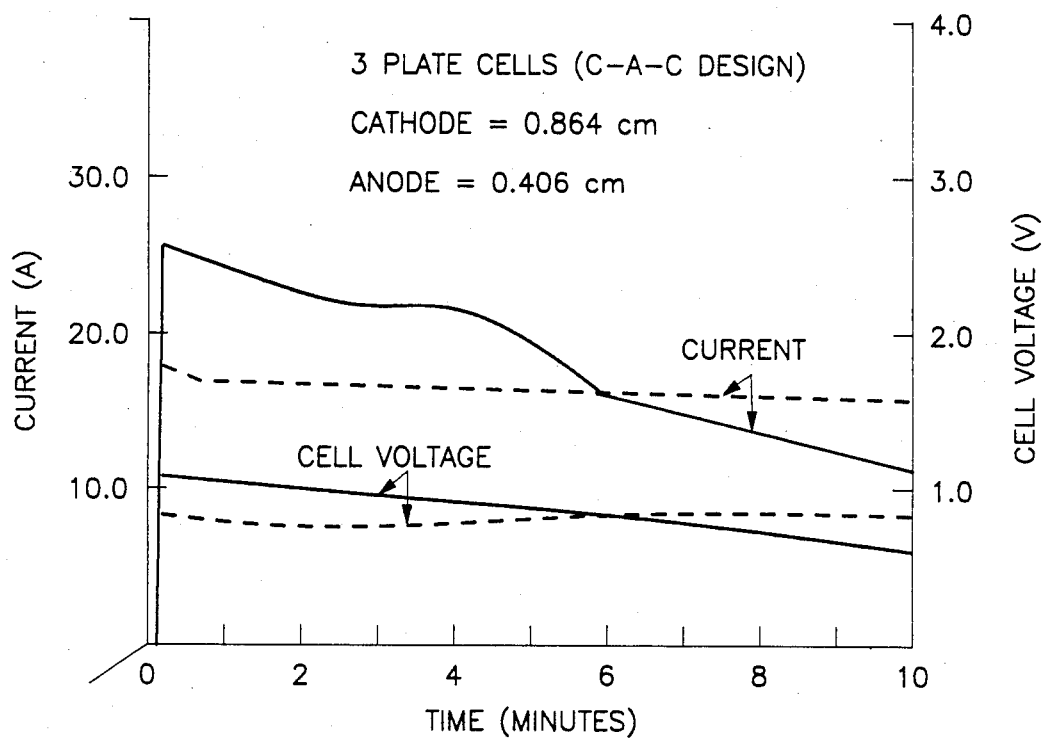
FIG. 3 shows plots of $Li/SOCl_2$ fresh cell behavior during low resistance discharge for baseline cathodes and cathodes doped with 25% ceramic fibers.

Very low resistive load (90±20 m Ohms) discharges were conducted on four anode limited 15.24 cm diameter - 95 Ah Li/SOCl₂ cells. Two cells had baseline cathodes and two cells had 25% ceramic doped cathodes. All cells were subjected to a very low resistive load after an active stand of 80 and 65 minutes respectively for cells with baseline and modified (or doped) cathodes, respectively. FIG. 3 shows the cell voltage and current results for the baseline cathode (solid line) and the modified cathode (dashed line). The peak current for the baseline cathode was 26.0 amps. The current then decreased to 11.5 amps in 10 minutes, whereas the maximum current for the cell with doped cathode was 18.2 amps and then decreased to 16.0 amps. The cells with doped cathodes exhibited approximately 30 percent less peak currents than the cells with baseline cathodes. However, the cells with ceramic doped cathodes exhibited relatively flat current and voltage behavior during discharge. This behavior may be due to the wetting conditions of the thick doped cathodes and lack of sufficient heat generation.

Figure 4:
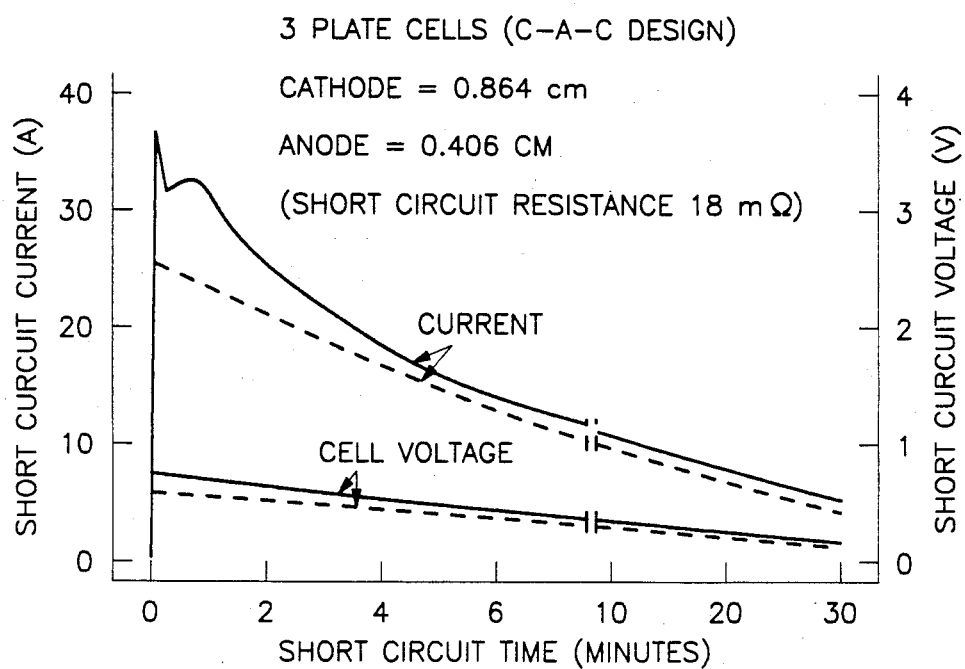
FIG. 4 illustrates plots of $Li/SOCl_2$ fresh cell behavior during external short circuit for a baseline cathode and a cathode doped with 25% ceramic fibers.

Short circuit tests were performed on the 10.16 cm diameter engineering test cells at 23° C. These cells were activated and allowed to stand for 24 hours. FIG. 4 shows the short circuit current and voltage behavior for these cells. The peak short circuit current for cells with baseline cathodes (solid lines) was 36 amps and 24.8 amps for the cell with ceramic doped cathode (dashed lines). The currents in both cells decreased to 4 and 3 amps respectively after 30 minutes. Short circuit voltage for both cells were initially less than 0.7 volts and decreased to about 0.1 volt after 30 minutes. It should be noted with respected to the testing of the cells, however, that much of the heat generated due to short circuiting was dissipated rather than being allowed to build up in the cells because much heavier than normal metal cases were used in the test cells. Under real life conditions, where relatively thin metal cases are used, if the peak currents are not reduced in some manner, explosion of the cells is quite likely within seconds of the occurrence of the short circuit condition.

These results confirm the different behavior with the two types of cathodes discussed under very low resistive load which simulates an internal short condition. The peak current in the modified cathode of the invention was reduced by nearly one third. Cells built with anode-cathode-anode design and/or anode layer larger (area) than cathode also generated lower peak currents with modified cathodes.

Both laboratory and large engineering test cell studies showed that the Li/SOCl₂ cell performance was not affected by doping the cathodes with an inert Al₂O₃-SiO₂ based ceramic material. The peak short circuit currents of Li/SOCl₂ cells, however, were reduced by nearly 35% when cathodes were doped with ceramic material. In addition, it was found that the reaction between the molten lithium and ceramics is either endothermic or mildly exothermic. As a result, ceramic material doped cathodes improve the safety of the Li/SOCl₂ system via the deaction of reactive lithium, particularly, during internal shorts. The use of ceramic doped cathodes and ceramic separators also eliminates the lithium-glass separator reaction during incineration.

We claim:

1. A reaction limiting cathode for a non-aqueous active metal electrochemical cell comprising an alkali metal anode, an electrolyte system including an electrolyte salt dissolved in a non-aqueous solvent depolarizer, said cathode comprising an amount of carbon black in an amount of binder and an amount of ceramic material, said ceramic material being substantially unreactive with other cell species below a predetermined temperture but capable of reacting to form substantially inactive products with the metal of the anode material at or above said predetermined temperature.

2. The cathode of claim 1 wherein said binder is PTFE and said ceramic material is substantially an alumina-silica material and makes up from about 5% to about 40% by weight of the cathode material.

3. The cathode of claim 2 wherein said cathode comprises ab out 5% PTFE.

4. The cathode of claim 2 wherein said ceramic material is in fibrous form.

5. A reaction limiting cathode for a non-aqueous metal electrochemical cell comprising a lithium anode, an electrolyte system including an electrolyte salt dissolved in a non-aqueous oxyhalide solvent depolarizer, said cathode comprising a blended composition containing an amount of carbon black, an amount of PTFE binder and an amount of ceramic material, of a substantially alumina-silica composition said ceramic material being substantially unreactive below the melting point of lithium but capable of reacting to form substantially inactive products with the lithium metal of the anode material at or above its melting point.

6. The cathode of claim 5 wherein said ceramic material comprises from about 5% to about 40% by weight of said blended composition.

7. The cathode of claim 6 wherein said ceramic material is in fiber form.

8. The cathode of claim 7 wherein said ceramic material is obtained by baking at 400° C. a ceramic paper containing 67% $Al_2O_3$, 28% $SiO_2$, 4% starch, 0.5% neoprene rubber and 0.5% acrylic polymer.

9. A method of preventing a violent reaction in a non-aqueous, active metal electrochemical cell comprising an alkali metal anode, an electrolyte system including an electrolyte salt dissolved in a solvent depolarizer, and a relatively inert cathode collector material comprising the step of doping said cathode material by introducing an amount of ceramic material capable of reacting to form a substantially inactive product with the metal of the anode at or above a predetermined temperature into said relatively inert cathode material.

10. The method of claim 9 wherein said ceramic material is blended into said cathode material to form an homogenous composition.

11. The method of claim 9 wherein said ceramic material is substantially an alumina-silica composition.

12. The method of claim 10 wherein said ceramic material is substantially an alumina-silica composition.

13. The method of claim 10 wherein said ceramic material comprises from about 5% to 40% by weight of the cathod mixture.

14. The method of claim 11 wherein said ceramic material comprises from about 5% to 40% by weight of the cathode mixture.

* * * * *